United States Patent
Tuukkanen

(10) Patent No.: US 9,639,346 B2
(45) Date of Patent: May 2, 2017

(54) METHOD AND APPARATUS FOR SOFTWARE UPDATES FOR EMBEDDED VEHICLE SYSTEMS

(71) Applicant: HERE Global B.V., Veldhoven (NL)

(72) Inventor: Marko Tapio Tuukkanen, Schlenzer (DE)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/738,363

(22) Filed: Jun. 12, 2015

(65) Prior Publication Data
US 2016/0364224 A1 Dec. 15, 2016

(51) Int. Cl.
G06F 9/44 (2006.01)
G06F 9/445 (2006.01)
H04L 29/08 (2006.01)

(52) U.S. Cl.
CPC ............. *G06F 8/65* (2013.01); *G06F 8/61* (2013.01); *G06F 8/67* (2013.01); *H04L 67/10* (2013.01); *H04L 67/12* (2013.01)

(58) Field of Classification Search
CPC .................................... G06F 8/61; G06F 8/65
USPC ........................................ 717/169, 174, 175
See application file for complete search history.

(56) References Cited

U.S. PATENT DOCUMENTS

| | | | |
|---|---|---|---|
| 5,610,815 A * | 3/1997 | Gudat | G01S 19/11 318/587 |
| 7,099,882 B2 | 8/2006 | McDonough | |
| 7,174,243 B1 * | 2/2007 | Lightner | G08G 1/20 340/989 |
| 7,480,907 B1 * | 1/2009 | Marolia | G06F 8/65 717/127 |
| 7,698,060 B2 | 4/2010 | Nomura | |
| 8,239,355 B2 | 8/2012 | Sekine et al. | |

(Continued)

FOREIGN PATENT DOCUMENTS

| | | |
|---|---|---|
| CN | 102968327 A | 3/2013 |
| CN | 103473351 A | 12/2013 |
| JP | 2013156216 A | 8/2013 |
| KR | 20110035251 A | 4/2011 |
| WO | 2006042771 A1 | 4/2006 |

OTHER PUBLICATIONS

Min et al., "A System Framework for Map Air Update Navigation Service", Aug. 2011, vol. 33, No. 4, retrieved on Jul. 3, 2015, from http://etrij.etri.re.kr/etrij/journal/article/article.do?volume=33&issue=&page=476, pp. 476-486.

(Continued)

*Primary Examiner* — Phillip H Nguyen
(74) *Attorney, Agent, or Firm* — Ditthavong & Steiner, P.C.

(57) ABSTRACT

An approach is provided for updating an embedded vehicle system during travel with one or more data packages configured based on the operating time associated with the travel. A maintenance platform determines an estimated operating time of at least one embedded system. The maintenance platform configures one or more data packages for performing one or more maintenance operations based, at least in part, on the estimated operating time. The maintenance platform then causes, at least in part, a transmission of the one or more data packages to the at least one embedded system to initiate the one or more maintenance operations during the estimated operating time.

19 Claims, 13 Drawing Sheets

(56) References Cited

U.S. PATENT DOCUMENTS

| | | | | |
|---|---|---|---|---|
| 2003/0135858 A1* | 7/2003 | Nemoto | ............... | H04H 20/62 |
| | | | | 725/75 |
| 2006/0211446 A1* | 9/2006 | Wittmann | ............. | G01C 21/26 |
| | | | | 455/552.1 |
| 2009/0119657 A1 | 5/2009 | Link, II | | |
| 2009/0326802 A1* | 12/2009 | Johnson | ............ | G01C 21/3492 |
| | | | | 701/533 |
| 2011/0307882 A1* | 12/2011 | Shiba | ...................... | G06F 8/65 |
| | | | | 717/173 |
| 2013/0245884 A1* | 9/2013 | Forutanpour | .......... | G01S 19/51 |
| | | | | 701/36 |
| 2015/0339114 A1* | 11/2015 | Rockwell | ................ | G06F 8/65 |
| | | | | 701/1 |
| 2016/0282132 A1* | 9/2016 | Bostick | ............ | G01C 21/3415 |

OTHER PUBLICATIONS

Symborski, "Updating Software and Configuration Data in a Distributed Communications Network", Computer Networking Symposium, Apr. 11-13, 1988, pp. 331-338.

Notification of Transmittal of the International Search Report and the Written Opinion of the International Searching Authority, or the Declaration; Written Opinion of the International Searching Authority; International Search Report for corresponding International Application No. PCT/IB2016/000820, mailed Sep. 19, 2016, 14 Pages.

\* cited by examiner

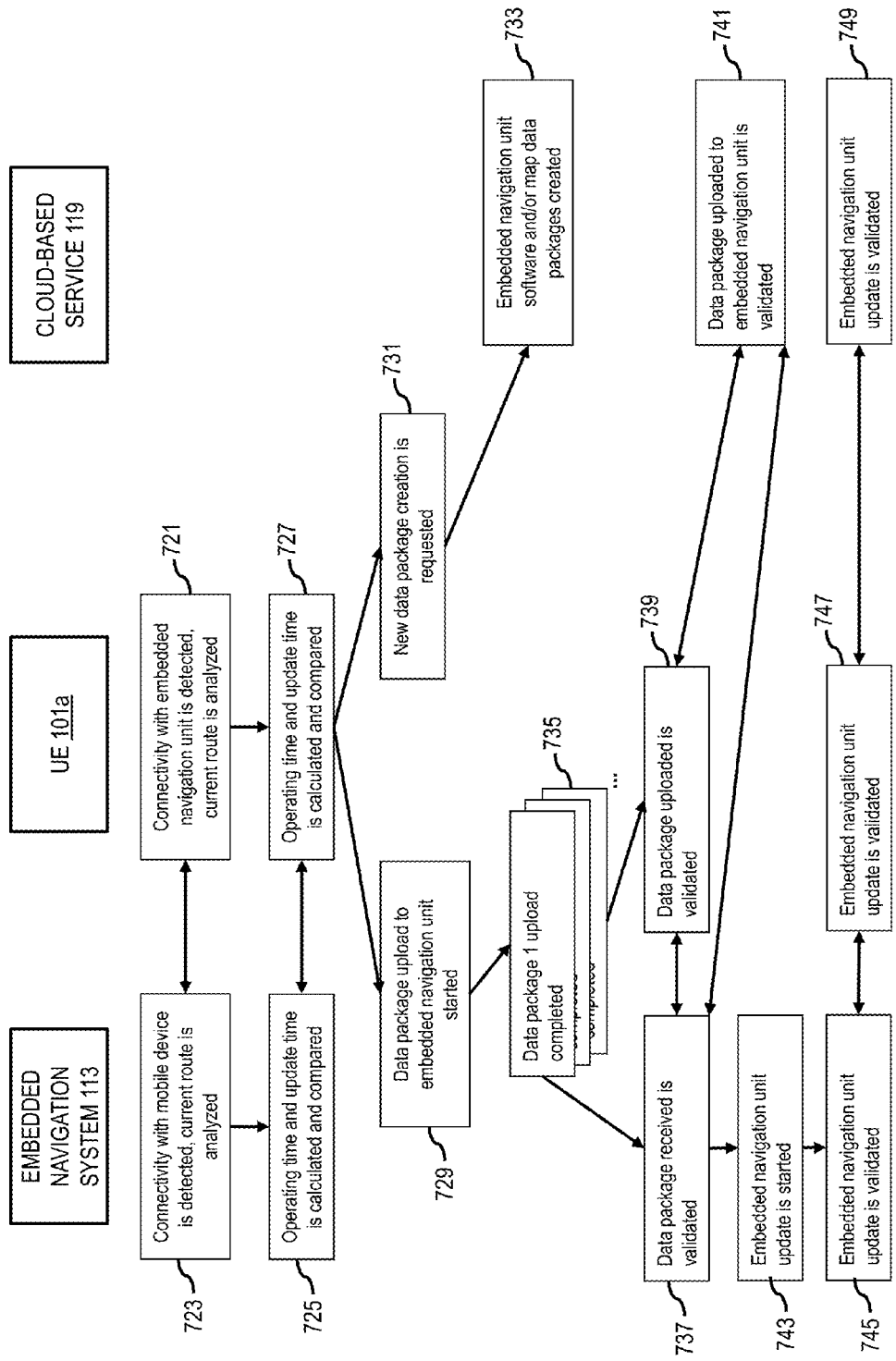

METHOD AND APPARATUS FOR SOFTWARE UPDATES FOR EMBEDDED VEHICLE SYSTEMS

BACKGROUND

Service providers and developers are continually challenged to deliver value and convenience to consumers by, for example, providing compelling network services. One area of interest has been the development of mapping and/or navigation applications that provide users of mobile devices (e.g., mobile phones, tablets, phablets, personal navigation devices (PNDs), etc.) with substantially real-time location-based information to assist them with their travels, especially while driving (e.g., driving to a vacation destination). In particular, navigation systems are becoming more widely used and increasingly integrated within vehicles (e.g., an embedded navigation system is often a standard feature among newer vehicles). However, such navigation systems often require periodic updates (e.g., software/firmware updates). Moreover, over the air (OTA) updates generally require stable connectivity and data subscriptions for the vehicle, which often prevents driving during the update process. Some navigation systems may be updated via a universal serial bus (USB) drive or a digital video disc (DVD). However, this approach requires user interaction and does not consider the available upload/installation time. In addition, during some OTA downloads, the vehicle cannot be moving and/or the engine needs to be running. Further, a disconnection during the update process (e.g., if a vehicle moves or its engine stops) often requires the updating and/or downloading process to be completely restarted anew. Accordingly, services providers and developers face significant technical challenges to enable users to periodically update embedded navigation systems while avoiding situations where the update process is cancelled due to a disconnection or the user having to remain in his or her vehicle until the update process is completed.

SOME EXAMPLE EMBODIMENTS

Therefore, there is a need for an approach for updating an embedded vehicle system (e.g., an embedded navigation system) during travel with one or more data packages configured based on the operating time associated with the travel.

According to one embodiment, a method comprises determining an estimated operating time of at least one embedded system. The method also comprises configuring one or more data packages for performing one or more maintenance operations based, at least in part, on the estimated operating time. The method further comprises causing, at least in part, a transmission of the one or more data packages to the at least one embedded system to initiate the one or more maintenance operations during the estimated operating time.

According to another embodiment, an apparatus comprises at least one processor, and at least one memory including computer program code for one or more computer programs, the at least one memory and the computer program code configured to, with the at least one processor, cause, at least in part, the apparatus to determine an estimated operating time of at least one embedded system. The apparatus is also caused to configure one or more data packages for performing one or more maintenance operations based, at least in part, on the estimated operating time. The apparatus further causes, at least in part, a transmission of the one or more data packages to the at least one embedded system to initiate the one or more maintenance operations during the estimated operating time.

According to another embodiment, a computer-readable storage medium carries one or more sequences of one or more instructions which, when executed by one or more processors, cause, at least in part, an apparatus to determine an estimated operating time of at least one embedded system. The apparatus is also caused to configure one or more data packages for performing one or more maintenance operations based, at least in part, on the estimated operating time. The apparatus further causes, at least in part, a transmission of the one or more data packages to the at least one embedded system to initiate the one or more maintenance operations during the estimated operating time.

According to another embodiment, an apparatus comprises means for determining an estimated operating time of at least one embedded system. The apparatus also comprises means for configuring one or more data packages for performing one or more maintenance operations based, at least in part, on the estimated operating time. The apparatus further comprises means for causing, at least in part, a transmission of the one or more data packages to the at least one embedded system to initiate the one or more maintenance operations during the estimated operating time.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A and 7B are flow charts illustrating processes for updating an embedded vehicle system during travel with one or more data packages configured based on the operating time associated with the travel, according to one embodiment.

DESCRIPTION OF SOME EMBODIMENTS

Examples of a method, apparatus, and computer program for updating an embedded navigation system using data packages configured based on an operating time between travel destinations and/or resource availability are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
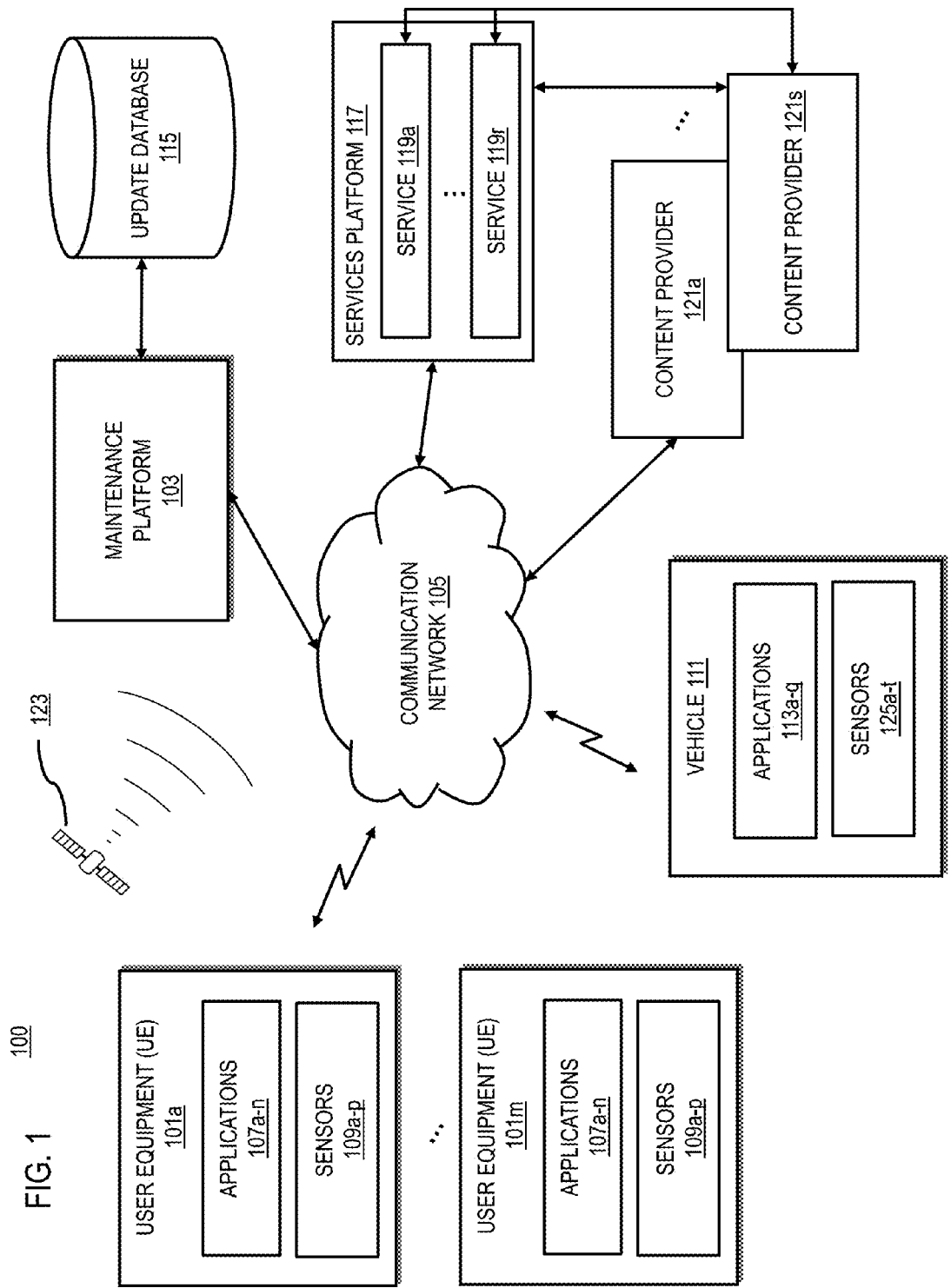
FIG. 1 is a diagram of a system capable of updating an embedded vehicle system during travel with one or more data packages configured based on the operating time associated with the travel, according to one embodiment.

FIG. 1 is a diagram of a system capable of updating an embedded vehicle system during travel with one or more data packages configured based on the operating time associated with the travel, according to one embodiment. As previously discussed, one area of interest among service providers and device manufacturers has been the development of mobile devices with substantially real-time location-based information to assist users with their travels (e.g., driving to a vacation destination). In particular, navigation systems are becoming more widely used and increasingly integrated within vehicles (e.g., an embedded navigation system is often a standard feature on newer model vehicles). However, such navigation systems typically require periodic updates (e.g., software/firmware updates). Such updates, whether received OTA or via a USB drive or DVD, generally require stable connectivity to prevent corruption (i.e., the vehicle must be stopped and the engine must be running). During the update process, if a disconnection occurs (e.g., the vehicle moves or the engine stops), the update and/or download process must be completely restarted anew.

To address this problem, a system 100 of FIG. 1 introduces the capability to update an embedded vehicle system during travel with one or more data packages configured based on the operating time associated with the travel. As shown in FIG. 1, the system 100 comprises one or more user equipment (UE) 101a-101m (e.g., mobile phones, tablets, phablets, PNDs, etc.) (also collectively referred to as UEs 101) having connectivity to a maintenance platform 103 via a communication network 105. The UEs 101 also include or have access to one or more applications 107a-107n (also collectively referred to as applications 107). By way of example, the applications 107 may include mapping and/or navigation applications, location-based applications (e.g., enabling location "check-ins"), an Internet browser, social networking applications, a music/video/media player, etc. In addition, the UEs 101 include one or more sensors 109a-109p (also collectively referred to as sensors 109). For example, the sensors 109 may include a Global Navigation Satellite System (GNSS) receiver, such as a Global Positioning System (GPS) receiver, a compass, an altitude sensor, an acceleration sensor, a near field communication (NFC) sensor, a barometric sensor, a speed sensor, an acceleration sensor, a movement sensor, or a combination thereof. The system 100 also include at least one vehicle 111 (e.g., an automobile) including or having access to one or more embedded systems 113a-113q (also collectively referred to as embedded systems 113) having connectivity to the maintenance platform 103 via the communication network 105 and having connectivity to the UEs 101, e.g., via one or more short-range wireless communication technologies (e.g., Bluetooth®, Bluetooth LE (BLE), NFC, wireless fidelity (WiFi), or a combination thereof). For example, the embedded systems or application 113 may include an embedded navigation system, an embedded diagnostic system, an embedded infotainment system, an embedded dashboard system, an embedded computer system, etc. For example, the embedded system 113 (e.g., the embedded navigation system 113) enable the vehicle 111 to notify the maintenance platform 103 of its location and/or route. In addition, the vehicle 111 includes one or more sensors 125a-125t (also collectively referred to as sensors 125). For example, the sensors 125 may include a GNSS receiver, such as a GPS receiver, a compass, an altitude sensor, an acceleration sensor, a NFC sensor, a barometric sensor, a speed sensor, an acceleration sensor, a movement sensor, or a combination thereof.

In one embodiment, the maintenance platform 103 may include or be associated with at least one update database 115. In one example embodiment, the maintenance platform 103 may exist in whole or in part within a UE 101 or independently and the update database 115 may exist in whole or in part within the maintenance platform 103. The at least one update database 115 may include, at least in part, one or more update embedded system 113 (e.g., software/firmware updates), one or more updates for an application 107, one or more data updates (e.g., media, map or navigation data), or a combination thereof. The at least one update database 115 may also include one or more credentials (e.g., a username and password) associated with the vehicle 111, the UEs 101, an embedded system 113 (e.g., the embedded navigation system 113), or a combination thereof to ensure data security.

The UEs 101 and the embedded systems 113 of the vehicle 111 are also connected to a services platform 117 via the communication network 105. In one embodiment, the services platform 117 includes one or more services 119a-119r (also collectively referred to as services 119). The services 119 may include a wide variety of services such as content provisioning services for one or more applications 107, one or more embedded systems 113, or a combination thereof. By way of example, the services 119 may include mapping and/or navigation services, cloud-based services, etc. In one embodiment, the maintenance platform 103, the update database 115, the services platform 117, and/or the services 119 may be implemented as one entity (e.g., a cloud-based service 119). In one embodiment, the UEs 101, the embedded vehicle systems 113, the services platform 117, and the service 119 also have connectivity to one or more content providers 121a-121s (also collectively referred to as content providers 121). For example, the content providers 121 also may provision a wide variety of content (e.g., maps, navigation routes, etc.) to the components of the system 100.

In one embodiment, the maintenance platform 103, the applications 107 (e.g., a mapping and/or navigation application), the embedded systems 113 (e.g., an embedded navigation system 113), or a combination thereof may utilize one or more location-based technologies (e.g., GPS, cellular triangulation, Assisted GPS (A-GPS), etc.) to determine a location of a UE 101, the vehicle 111, or a combination thereof to make a request to one or more services 119, the update database 115, or a combination thereof for location-based data (e.g., mapping and/or navigation information) based on a position relative to the UE 101, the vehicle 111, or a combination thereof. For example, a UE 101 may include a GPS receiver 109 to obtain geographic coordinates from the satellites 123 to determine its location when possible.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

To address the problem of updating embedded systems 113 of a vehicle 111 while avoiding the update being cancelled due to a disconnection (e.g., the vehicle 111 moving or the vehicle 111's engine being turned off) or a user having to stay in the vehicle 111 until the update process is complete, the system 100 of FIG. 1 determines that an update for an embedded system 113 is available from a service 119 (e.g., a cloud-based service 119). For example, an embedded navigation system 113 software and/or map data update may be available. It is contemplated that the initial software and data has already been installed on an embedded system 113 (e.g., an embedded navigation system 113). It is also contemplated that the current version of the embedded vehicle system 113 software and data has also been stored with, e.g., a service 119 (e.g., a cloud-based service 119).

In one embodiment, the system 100 may cause, at least in part, a notification to be displayed on a UE 101 (e.g., a mobile device) with respect to a request for user interaction. The system 100 can then determine a receipt of a user action for proceeding with the embedded vehicle system 113 software and/or data update. In one embodiment, the embedded system 113 software and/or data update does not require any user interaction. In one embodiment, upon determination of the user's interaction (e.g., with a UE 101) or without any user interaction, the system 100 determines device capability information (e.g., available storage and connectivity), resource availability information (e.g., an embedded navigation system update requirements), or a combination thereof associated with the at least one embedded system 113 (e.g., the embedded navigation system 113), the at least one user device (e.g., a UE 101 such as a mobile phone), the at least one cloud service (e.g., a cloud-based service 119), or a combination thereof. In one embodiment, the system 100 analyzes the maximum storage space of a user's UE 101 (e.g., a mobile phone), an embedded system 113 (e.g., the embedded navigation system 113), or a combination thereof to define the maximum size of the one or more data packages. In one example use case, if the system 100 has already determined the current user's navigation route, the system 100 can determine the operating time and the update time and the system 100 can cause, at least in part, a configuration of the one or more data packages accordingly. Otherwise, in one embodiment, the system 100 causes, at least in part, the one or more packages to be configured based, at least in part, on available space (e.g., the storage space associated with a UE 101 and/or an embedded system 113).

In one embodiment, the system 100 causes, at least in part, the one or more newly available data packages to be downloaded from a service 119 (e.g., a cloud-based service 119) or the update database 115 to a user's UE 101 (e.g., a mobile phone or tablet). For example, the downloading from a service 119 or the update database 115 to a user's UE 101 may occur outside of the user's vehicle 111 and the one or more newly available data packages can follow the user to his or her vehicle 111 via the user's UE 101. In one embodiment, wherein the current user's navigation route is not already known, once connectivity between a user's UE 101 and an embedded system 113 (e.g., the embedded navigation system 113) is determined by the system 100, the system 100 determines an estimated operating time of the embedded system 113 (e.g., the embedded navigation system 113). For example, the system 100 may determine the estimated operating time based, at least in part, on a user route and/or destination if this information has already been entered by a user into the embedded system 113, the UE 101, or a cloud-based service 119.

In one embodiment, the system 100 determines the estimated operating time based, at least in part, on at least one predicted route of at least one user of the at least one embedded system 113 (e.g., the embedded navigation system 113). For example, the system 100 may determine from a user's calendar (e.g., a calendar application 107), contextual information (e.g., day of the week or time of day), one or more historical trends associated with the user, a vehicle 111, or a combination thereof, etc. that a user is likely to drive his or her vehicle (e.g., the vehicle 111) from point A to point B in the near future using one of three different routes and that the estimated operating time irrespective of the route selected will be approximately 45 minutes.

In one embodiment, both an embedded system 113 (e.g., the embedded navigation system 113) and/or a UE 101 (e.g., a mobile phone) can analyze the predicted and/or current route of the user. In one example use case, the system 100 may determine the estimated operating time from the time at which a user reaches the vehicle 111 (e.g., subtracting two minutes for a user to start the vehicle 111, put on his or her seat belt, etc.) to the time where the vehicle 111 is turned off (e.g., adding two minutes for when the embedded system 113 is still operational after the vehicle 111 has been shut down).

In one or more embodiments, wherein the at least one predicted route includes a plurality of routes to be completed over a plurality of operating sessions of the at least one embedded navigation system 113, the system 100 determines the estimated operating time based, at least in part, on the plurality of operating sessions. For example, a user may input a number of stops along a travel route (e.g., stops at a grocery store, a dry cleaner, etc.) into the embedded navigation system 113, an application 107 (e.g., a mapping/navigation application), and/or a cloud-based navigation service 119. The system 100 may predict the amount of time to reach each new destination from each new starting point. For example, the system 100 may predict (e.g., based on available route and traffic information) that an embedded navigation system 113 will be operating for 20 minutes between a user's home and the grocery store; for 10 minutes between the grocery store and a dry cleaner; and for 40 minutes between the dry cleaner and the user's place of employment. It is contemplated that the system 100 may factor traffic and weather information provided by a content provider 121 or a service 119 into the prediction. In addition, it is contemplated that a user can input a multimodal route into the system 100, for which driving is only a part. For example, a user could be walking to the vehicle 111 while the system 100 determines the estimated operating time, and in this context it is for a future route. In addition, a user can also set a departure time for the future (e.g., using a UE 101) when creating a route plan. In this example use case, current route is also possible; however, this would not be used very often as the update would be received at a UE 101 potentially when the vehicle 111 is moving and, therefore, susceptible to disconnection.

In one or more embodiments, the system 100 determines an available upload time, an available installation time, or a combination thereof based, at least in part, on the estimated operating time. In one embodiment, once the system 100 determines both the estimated operating time and the required upload time for the one or more packages, the system 100 causes, at least in part, a comparison of the two. By way of example, if the system 100 determines that the estimated operating time is 60 minutes, the system 100 can determine that the required upload/update time is as follows: 60 minutes−25%=45 minutes. Further, in one example use case, the system 100 may determine that uploading one of the one or more data packages (with validation) will take the system 100 five minutes and that updating the embedded system 113 (e.g., the embedded navigation system 113) will take the system 100 another five minutes for a total of ten minutes per data package. In one example use case, the system 100 may configure the one or more data packages based, at least in part on one or more increments, e.g. 10 minute increments, which would allow an embedded system 113 to be updated during the 60 minute operating session with four data packages. In one embodiment, at this time, a service 119 (e.g., a cloud-based service 119) may have multiple data packages available and each data package can be independently uploaded to a UE 101, an embedded system 113, or a combination thereof. However, if the system 100 determines that the operating time (i.e., time need for navigation) is less than what is required to upload the one or more data packages, the system 100 can determine that one or more smaller data packages are required by a UE 101, an embedded system 113, or a combination thereof.

In one embodiment, the system 100 configures one or more data packages for performing one or more maintenance operations based, at least in part, on the estimated operating time. In the example just discussed, the system 100 has already determined that the estimated operating time is 60 minutes and that the actual available upload/update time is 45 minutes. In addition, the system 100 has also already determined that each of the one or more data packages will take the system 100 10 minutes to upload and to update an embedded system 113. Therefore, in one example, the system 100 may configure, for example, 4 data packages for uploading and updating as four individual data packages or as two plus two packages. In one embodiment, if the system 100 determines that the operating time is less than the required upload time, the system 100 can cause, at least in part, a request to be sent to a service 119 (e.g., a cloud-based service 119) to reduce the size, e.g. one or more increments, of the one or more data packages. In one embodiment, the system 100 causes, at least in part, a configuration of the one or more data packages based, at least in part, on the device capability information, resource availability information (e.g., available storage space), the estimated operating time, or a combination thereof.

In one or more embodiments, the system 100 determines one or more dependencies among the one or more data packages for performing the one or more maintenance operations (e.g., if one or more updates need to be performed in sequential order). In one embodiment, the system 100 causes, at least in part, a configuring of the one or more data packages based, at least in part, on the one or more determined dependencies. In the example discussed above, the system 100 could cause, at least in part, a cloud-based service 119, for example, to configure the four data packages independently or as two groups of two packages (e.g., 2+2 packages), wherein the data packages or groups may be based on different increments. In addition, wherein the at least one predicted route includes a plurality of routes, the system 100 may configure the one or more data packages so that the one or more maintenance operations are performed over the plurality of operating sessions (e.g., driving between a user's home and the grocery store, between the grocery store and the dry cleaner, and then between the dry cleaner and the user's place of employment).

In one embodiment, the system 100 causes, at least in part, a transmission of the one or more data packages to at least one embedded system 113 (e.g., the embedded navigation system 113) to initiate the one or more maintenance operations during the estimated operating time. By way of example, the system 100 may cause, at least in part, a service 119 (e.g., a cloud-based service 119) and/or the update database 115 to transmit one or more data packages to a UE 101 associated with a user or an embedded system 113 via the communication network 105. In one embodiment, the system 100 may also cause, at least in part, a UE 101 (e.g., a mobile phone) to transmit the one or more data packages to an embedded system 113 via one or more short-range communication technologies (e.g., Bluetooth®). For example, a user may connect a UE 101 (e.g., a mobile phone or a tablet) to an embedded system 113 via a cable or a user may keep a UE 101 in his or her pocket or handbag once inside of the vehicle 111 in order to transmit the one or more data packages between the UE 101 and the embedded system 113. In particular, the one or more maintenance operations may include at least one application update operation (e.g., a system update), at least one data update operation (e.g., updating mapping and/or navigation data), or a combination thereof. In one embodiment, the transmission of the one or more data packages is also based, at least in part, on device capability information, resource availability information, estimated operating time, or a combination thereof. In one embodiment, if the vehicle 111 and/or an embedded system 113 are shutdown, the transmission of the one or more data packages between a UE 101 and the embedded system 113 can continue once the embedded system 113 is available without further user interaction.

In one embodiment, the system 100 causes, at least in part, a validation of (a) the one or more data packages, (b) a progress of one or more steps of the one or more maintenance operations, (c) a successful completion of the one or more maintenance operations, or (d) a combination thereof with respect to the at least one embedded system, the at least one user device, the at least one cloud service, or a combination thereof. In one embodiment, the system 100 causes, at least in part, the embedded system 113 to verify that an update has been completed and the system 100 also causes, at least in part, the UE 101 used for the transfer to retrospectively validate that the embedded system 113 has been successfully updated. It is contemplated that this ensures that the one or more data packages that have been uploaded from the UE 101 to the embedded system 113 are consistent on both devices and that embedded system 113 software has not been corrupted once updated. For example, the system 100 can determine whether any data is corrupted, whether the package size is correct, whether the authentication keys and certificates are correct, etc. In one embodiment, the system 100 causes, at least in part, a validation of the one or more data packages before the system 100 causes, at least in part, an initiation of the one or more maintenance operations. In one embodiment, once the one or more data packages are validated, the system 100 can cause, at least in part, the one or more uploaded data packages to be kept in the memory of the embedded system 113 (e.g., the embedded navigation system 113) and can cause, at least in part, the one or more data packages to be installed by an embedded system 113 at a later time (e.g., along a second leg of a travel route). In one embodiment, once the system 100 completes the validation of the one or more data packages, the system 100 can cause, at least in part, the one or more data packages to be moved from shared memory of an embedded system 113 (e.g., the embedded navigation system 113) to protected memory. In one embodiment, only one or more data packages that can be updated during the estimated operating time will be used by the system 100. In one or more embodiments, the system 100 can cause, at least in part, incomplete and/or non-validated packages to be deleted from the memory of a UE 101, an embedded system 113, or a combination thereof.

By way of example, the UEs 101, the maintenance platform 103, the applications 107, the sensors 109, the at least one vehicle 111, the embedded systems 113, the update database 115, the services platform 117, the services 119, the content providers 121, and the satellites 123 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
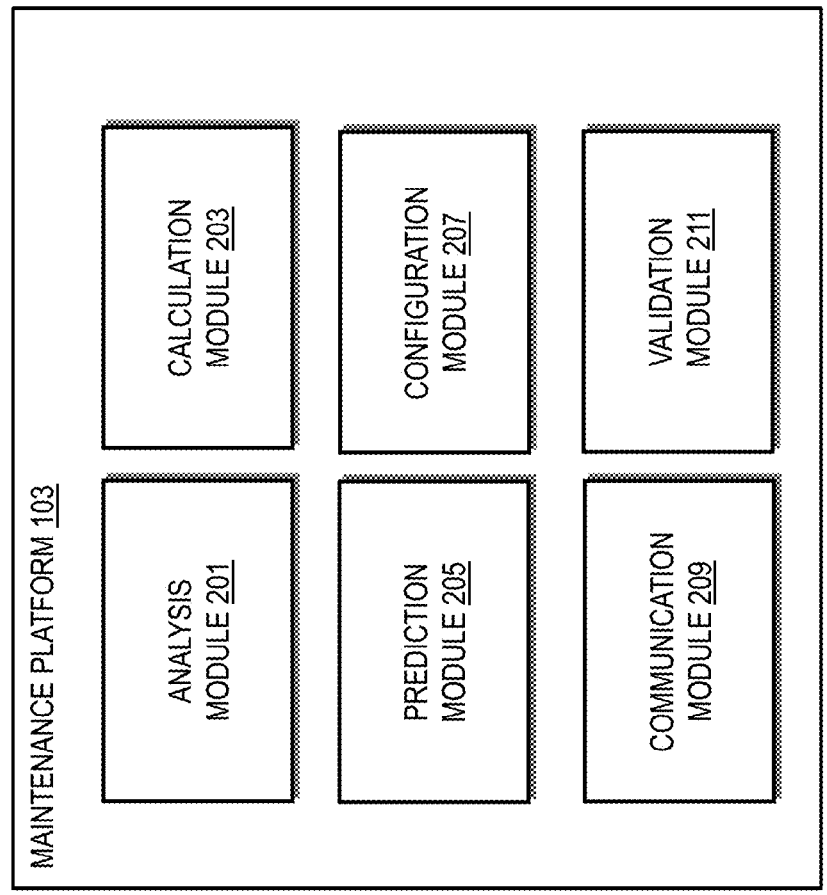
FIG. 2 is a diagram of the components of a maintenance platform 103, according to one embodiment.

FIG. 2 is a diagram of the components of the maintenance platform 103, according to one embodiment. By way of example, the maintenance platform 103 includes one or more components for updating an embedded vehicle system during travel and/or running of the vehicle with one or more data packages configured based on the operating time associated with the travel. It is contemplated that the functions of these components may be combined in one or more components or performed by other components of equivalent functionality. In this embodiment, the maintenance platform 103 includes an analysis module 201, a calculation module 203, a prediction module 205, a configuration module 207, a communication module 209, and a validation module 211, or any combination thereof.

In one embodiment, the analysis module 201 is used to determine device capability information, resource information, or a combination thereof associated with the at least one embedded system 113 (e.g., the embedded navigation system 113), the at least one user device (e.g., a UE 101), the at least one cloud service (e.g., a cloud-based service 119), or a combination thereof. By way of example, the analysis module 201 may analyze the maximum available storage space of a user's UE 101 (e.g., a mobile phone), an embedded system 113 (e.g., the embedded navigation system 113), or a combination thereof to define the maximum size of the one or more data packages. In one example use case, the analysis module 201 may determine that a vehicle 111 has a 5 gigabyte (GB) monthly data limit and/or that a user's UE 101 (e.g., a mobile phone) only has 2 GB of available memory. The analysis module 201 may also be used to determine one or more dependencies among the one or more data packages for performing the one or more maintenance operations. For example, the analysis module 201 may determine that the four data packages of the example use case discussed above have to be uploaded/updated sequentially or that all four data packages must be uploaded/updated during the same operating time.

The calculation module 203 in certain embodiments is used to determine an estimated operating time of at least one embedded system 113. By way of example, the calculation module 203 may determine an estimated operating time based, at least in part, on a user's route and/or destination if this information has already been entered into an embedded system 113 (e.g., the embedded navigation system 113), a UE 101 (e.g., a mobile device), or a service 119 (e.g., a cloud-based service 119). In one embodiment, wherein the at least one predicted route includes a plurality of routes to be completed over a plurality of operating sessions, the calculation module 203 may also be used to determine the estimated operating time based, at least in part, on a plurality of operating sessions. By way of example, the calculation module 203 may predict the estimated operating time based on an estimated time required to reach each new destination from each new starting point. The calculation module 203 also may be used to determine an available upload time, an available installation time, or a combination thereof based, at least in part, on the estimated operating time. By way of example, if the calculation module 203 determines that the estimated operating time is 60 minutes, the extraction module 203 can determine that the required upload/update time is as follows: 60 minutes−25%=45 minutes. Further, the calculation module 203 may determine that uploading one of the one or more data packages (with validation) will take the communication module 209 five minutes and updating the embedded system 113 (e.g., the embedded navigation system 113) with the uploaded data package will take the configuration module 207 another five minutes for a total of ten minutes per data package. Further, in one embodiment, the calculation module 203 may cause, at least in part, a configuration of one or more data packages based on different increments, e.g. based on the plurality of the routes.

In one embodiment, the prediction module 205 is used to determine the estimated operating time based, at least in part, on at least one predicted route and/or destination of at least one user of at least one embedded system 113. For example, the prediction module 205 may determine from a user's calendar (e.g., a calendar application 107), contextual information (e.g., day of the week or time of day), one or more historical trends associated with a user, a vehicle 111, or a combination thereof, etc. that a user is likely to drive his or her vehicle 111 from point A to point B in the near future using one of three different routes and that the estimated operating time irrespective of the particular route selected by the user will be approximately 45 minutes.

The configuration module 207 in certain embodiments is used to configure one or more data packages for performing one or more maintenance operations based, at least in part, on the estimated operating time. By way of example, the calculation module 203 may determine that an estimated operating time is 60 minutes and that the actual available upload/update time is 45 minutes. The calculation module 203 may also determine that each of the one or more data packages takes 10 minutes for the communication module 209 to upload and for the configuration module 207 to update an embedded system 113 (e.g., the embedded navigation system 113). Therefore, in one example, the configuration module 207 may configure, for example, four data packages, two plus two data packages, one plus three data packages, etc. for uploading to and updating an embedded system 113. In one embodiment, if the calculation module 203 determines that the operating time is less than the required upload/update time, the configuration module 207 can cause, at least in part, a reduction of the size of the one or more data packages. In one embodiment, the configuration module 207 may cause, at least in part, a configuration of one or more data packages based, at least in part, on device capability information, resource availability information, estimated operating time, or a combination thereof. Further, in one embodiment, the configuration module 207 may cause, at least in part, a configuration of one or more data packages based, at least in part, on the analysis module 201's determination of any dependencies among the one or more data packages.

In one embodiment, the communication module 209 is used to cause, at least in part, a transmission of the one or more data packages to at least one embedded system 113 to initiate one or more maintenance operations during the estimated operating time. By way of example, the communication module 209 may cause, at least in part, a service 119 (e.g., a cloud-based service 119) and/or the update database 115 to transmit one or more data packages to a UE 101 (e.g., a mobile phone) associated with a user or to an embedded system 113 (e.g., the embedded navigation system 113) via the communication network 105. In one embodiment, the communication module 209 may also cause, at least in part, a UE 101 (e.g., a mobile phone) to transmit the one or more data packages to an embedded system 113 (e.g., the embedded navigation system 113) via one or more short-range communication technologies (e.g., Bluetooth®). In one embodiment, the communication module 209 may cause, at least in part, a transmission of the one or more data packages based, at least in part, on a device capability, resource availability information, estimated operating time, or a combination thereof. In one embodiment, the communication module 209 may also cause, at least in part, a service 119 (e.g. a cloud-based service 119) and/or the update database 115 to transmit the one or more data packages directly to the embedded system 113 (e.g., the embedded navigation system 113) via one or more communication technologies.

The validation module 211 in certain embodiments is used to cause, at least in part, a validation of (a) the one or more data packages, (b) a progress of one or more steps of the one or more maintenance operations, (c) a successful completion of the one or more maintenance operations, or (d) combination thereof with respect to the at least one embedded system 113 (e.g., the embedded navigation system 113), at least one user device (e.g., a UE 101 such as a mobile phone), at least one cloud service (e.g., a cloud-based service 119), or a combination thereof. By way of example, the validation module 211 can determine whether any of the data is corrupted, whether the package size is correct, whether the authentication keys and certificates are correct, etc. In one embodiment, the validation module 211 may cause, at least in part, a validation of the one or more data packages before the communication module 209 causes, at least in the part, an initiation of the one or more maintenance operations.

Figure 3:
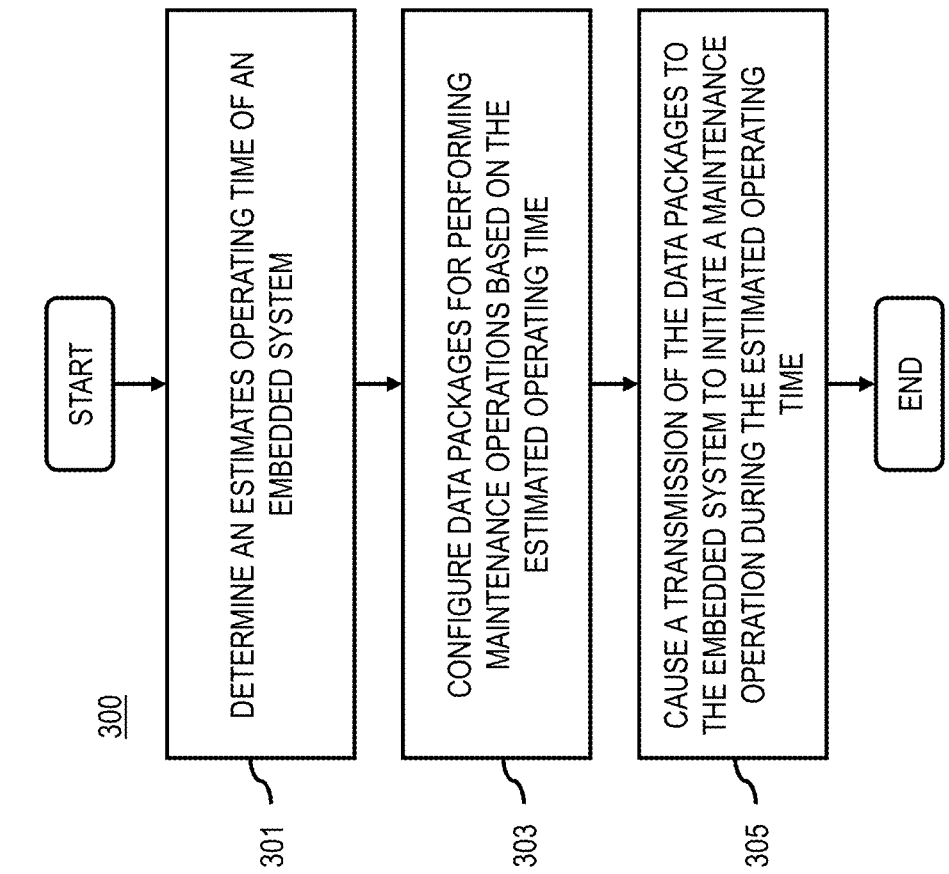
FIG. 3 is a flowchart of a process for updating an embedded vehicle system during travel with one or more data packages configured based on the operating time associated with the travel, according to one embodiment.
Figure 10:
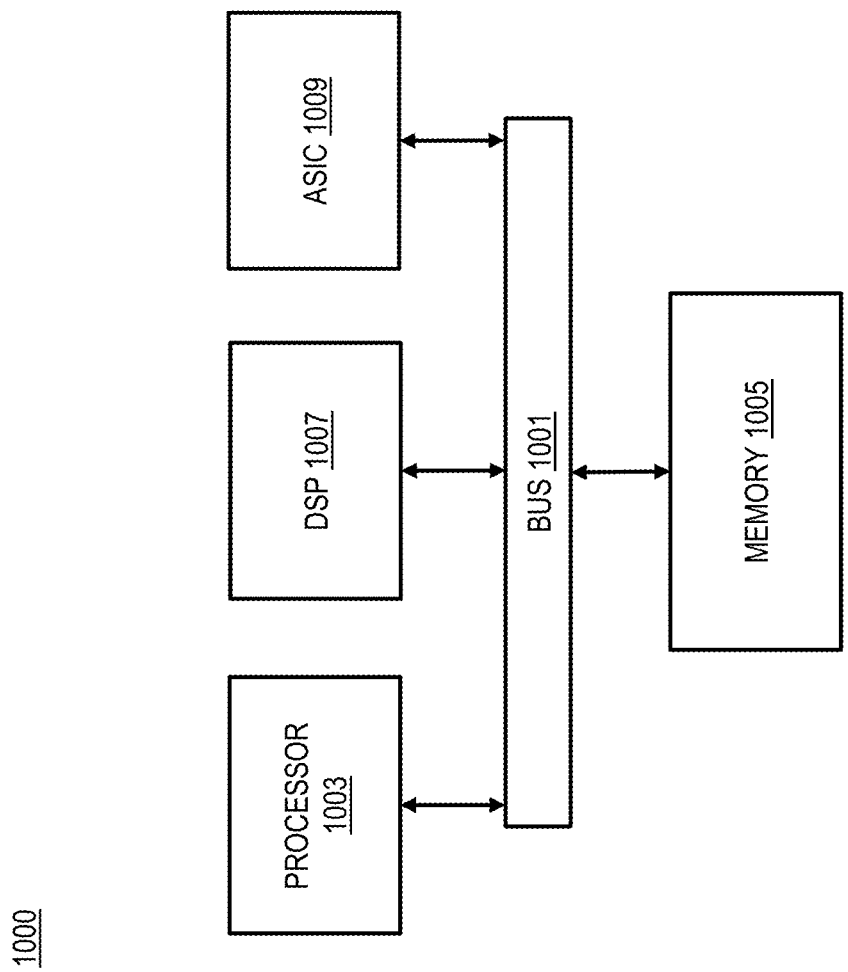
FIG. 10 is a diagram of a chip set that can be used to implement an embodiment of the invention.

FIG. 3 is a flowchart of a process for updating an embedded vehicle system during travel with one or more data packages configured based on the operating time associated with the travel, according to one embodiment. In one embodiment, the maintenance platform 103 performs the process 300 and is implemented in, for instance, a chip set including a processor and a memory as shown in FIG. 10. In step 301, the maintenance platform 103 determines an estimated operating time of at least one embedded system. By way of example, the maintenance platform 103 may determine an estimated operating time based, at least in part, on a user's route and/or destination if this information has already been entered into an embedded system 113 (e.g., the embedded navigation system 113), a UE 101 (e.g., a mobile phone or tablet), or a service 119 (e.g., a cloud-based service 119).

In 303, the maintenance platform 103 configures one or more data packages for performing one or more maintenance operations based, at least in part, on the estimated operating time. By way of example, the maintenance platform 103 may determine that an estimated operating time is 60 minutes and that the actual available upload/update time is 45 minutes (e.g., 60 minutes−25%=45 minutes). The maintenance platform 103 may also determine that each of the one or more data packages takes 10 minutes to upload and to update an embedded system 113 (e.g., the embedded navigation system 113). Consequently, in one example use case, the maintenance platform 103 may configure, for example, four data packages, two plus two data packages, one plus three data packages, etc., for uploading and for updating an embedded system 113. In one embodiment, if the maintenance platform 103 determines that the operating time is less than the required upload/update time, the maintenance platform 103 can cause, at least in part, a reduction of the size, i.e., an increment, of the one or more data packages.

In step 305, the maintenance platform 103 causes, at least in part, a transmission of the one or more data packages to the at least one embedded system to initiate the one or more maintenance operations during the estimated operating time. By way of example, the maintenance platform 103 may cause, at least in part, a service 119 (e.g., a cloud-based service 119) to transmit one or more data packages to a UE 101 (e.g., a mobile phone) associated with a user or to an embedded system 113 (e.g., the embedded navigation system 113) via the communication network 105. In one embodiment, maintenance platform 103 may also cause, at least in part, a UE 101 (e.g., a mobile phone) to transmit the one or more data packages to an embedded system 113 (e.g., the embedded navigation system 113) via one or more short-range communication technologies (e.g., Bluetooth®)).

Figure 4:
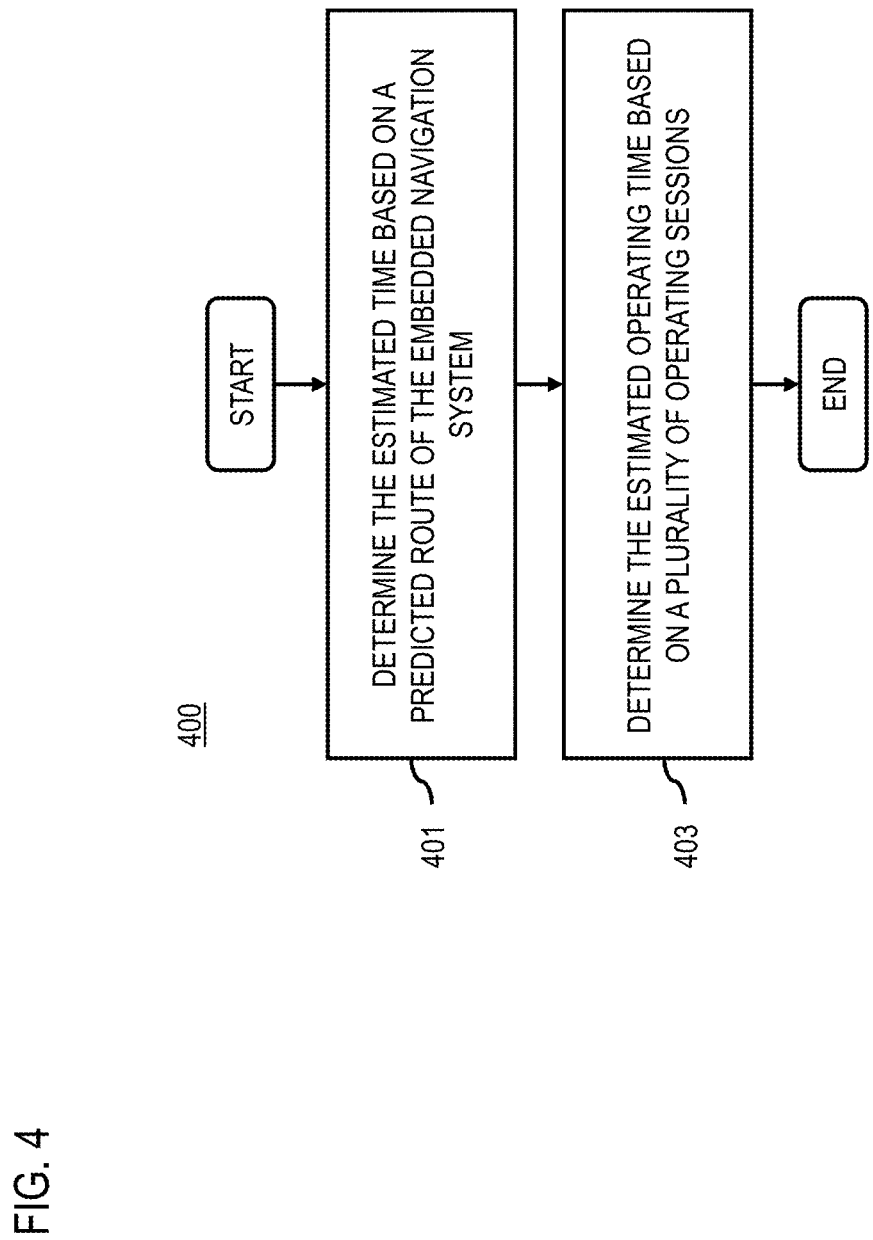
FIG. 4 is a flowchart of a process for determining the operating time of an embedded system while traveling, according to one embodiment.

FIG. 4 is a flowchart of a process for determining the operating time of an embedded vehicle system while traveling, according to one embodiment. In one embodiment, the maintenance platform 103 performs the process 400 and is implemented in, for instance, a chip set including a processor and a memory as shown in FIG. 10. In step 401, the maintenance platform 103 determines the estimated operating time based, at least in part, on at least one predicted route of the at least one embedded navigation system. By way of example, the maintenance platform 103 may determine from a user's calendar, contextual information (e.g., day of the week or time of day), one or more historical trends associated with a user, a vehicle 111, or a combination thereof, etc., that a user is likely to drive his or her vehicle from point A to point B in the near future using one of three different routes and that the estimated operating time irrespective of the particular route selected by the user will be approximately 45 minutes.

In step 403, wherein the at least one predicted route includes a plurality of routes to be completed over a plurality of operating sessions of the at least one embedded navigation system, the maintenance platform 103 determines the estimated operating time based, at least in part, on the plurality of operating sessions. By way of example, a user may enter a number of stops along a travel route into the embedded navigation system 113 (e.g., stops at a grocery store, a dry cleaner, etc.). The maintenance platform 103 may predict the amount of time required to reach each new destination from each new starting point. For example, the maintenance platform 103 may predict (e.g., based on available route and traffic information) that an embedded system 113 (e.g., the embedded navigation system 113) will be operating for 20 minutes between the user's home and the grocery store; 10 minutes between the grocery store and the dry cleaner; and 30 minutes between the dry cleaner and the user's place of employment.

Figure 5:
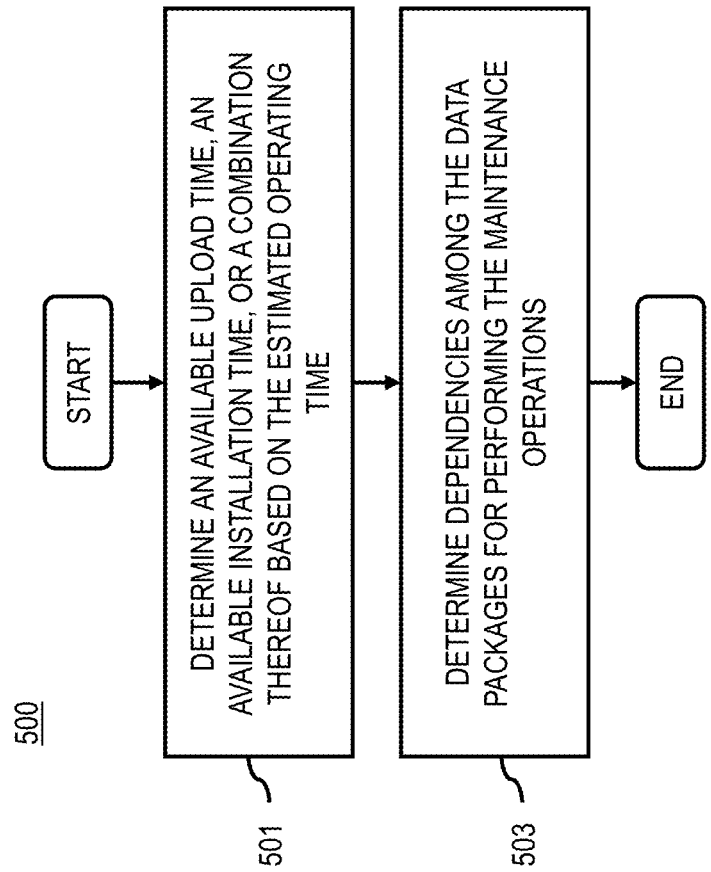
FIG. 5 is a flowchart of a process for configuring the one or more data packages for performing one or more maintenance operations associated with an embedded vehicle system, according to one embodiment.

FIG. 5 is a flowchart of a process for configuring the one or more data packages for performing one or more maintenance operations associated with an embedded vehicle system, according to one embodiment. In one embodiment, the maintenance platform 103 performs the process 500 and is implemented in, for instance, a chip set including a processor and a memory as shown in FIG. 10. In step 501, the maintenance platform 103 determines an available upload time, an available installation time, or a combination thereof based, at least in part, on the estimated operating time, wherein the configuring on the one or more data packages is further based, at least in part, on the available upload time, the available installation time, or a combination thereof. By way of example, if the maintenance platform 103 determine that the estimated operating time is 60 minutes, the maintenance platform 103 can determine that the available upload/update time is as follows: 60 minutes−25%=45 minutes. Further, the maintenance platform 103 may determine that uploading one of the one or more data packages (with validation) may take the maintenance platform 103 five minutes and updating an embedded system 113 (e.g., the embedded navigation system 113) with the uploaded data package may take the maintenance platform 103 another five minutes for a total of ten minutes per data package. In one example use case, the maintenance platform 103 may configure the one or more data packages based, at least in part, on 10 minute increments, which would allow an embedded system 113 to be updated during the 60 minute operating session with four data packages.

In step 503, the maintenance platform 103 determines one or more dependencies among the one or more data packages for performing the one or more maintenance operations, wherein the configuring of the one or more data packages is further based, at least in part, on the one or more dependencies. By way of example, the maintenance platform 103 may determine that the four data packages of the example use case discussed above have to be uploaded/updated sequentially or that all four data packages must be uploaded/updated during the same operating time.

Figure 6:
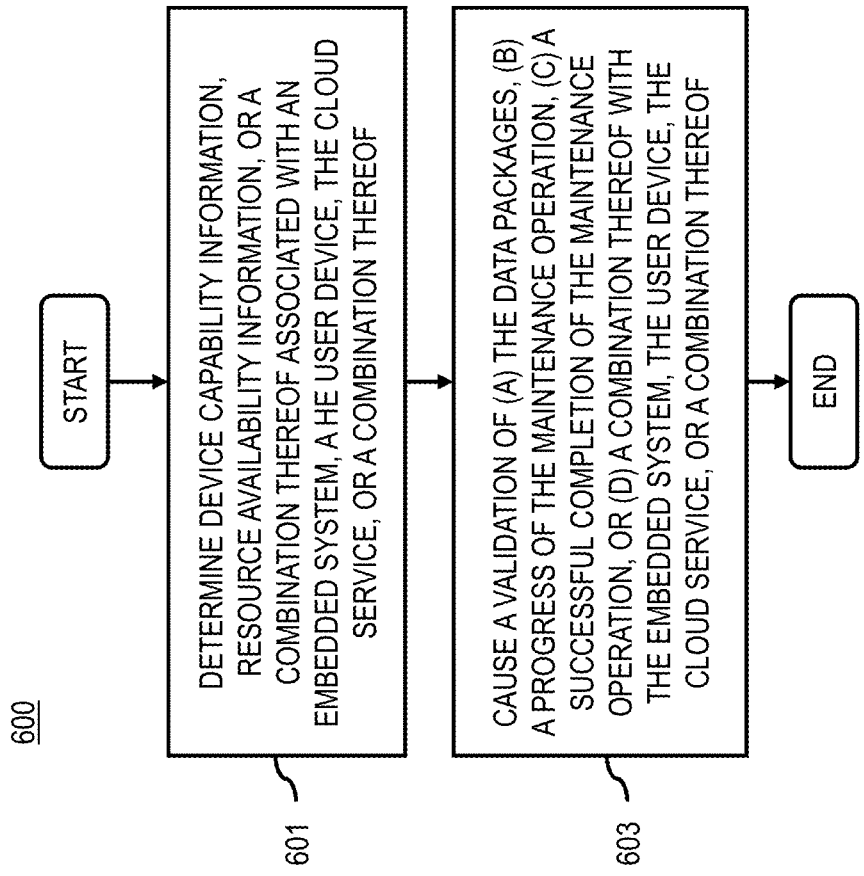
FIG. 6 is a flowchart of a process for transmitting and then validating the one or more data packages, according to one embodiment.

FIG. 6 is a flowchart of a process for transmitting and validating the one or more data packages, according to one embodiment. In one embodiment, the maintenance platform 103 performs the process 600 and is implemented in, for instance, a chip set including a processor and a memory as shown in FIG. 10. In step 601, the maintenance platform 103 determines device capability information, resource availability information, or a combination thereof associated with the at least one embedded system, the at least one user device, the at least one cloud service, or a combination thereof, wherein the transmission of the one or more data packages, the configuring of the one or more data packages, or a combination thereof is further based, at least in part, on the device capability information, the resource availability information, the estimated operating time, or a combination thereof. By way of example, the maintenance platform 103 may analyze the maximum available storage space of a user's UE 101 (e.g., a mobile phone), an embedded system 113 (e.g., the embedded navigation system 113), or a combination thereof to define the maximum size of the one or more data packages. Further, in one example use case, the maintenance platform 103 may determine that a vehicle (e.g., the vehicle 111) has a 5 GB monthly data limit and/or that a user's UE 101 (e.g., a mobile phone) only has 2 GB of available memory. Consequently, the maintenance platform 103 may configure the one or more data packages accordingly.

In step 603, the maintenance platform 103 causes, at least in part, a validation of (a) the one or more data packages, (b) a progress of one or more steps of the one or more maintenance operations, (c) a successful completion of the one or more maintenance operations, or (d) a combination thereof with respect to the at least one embedded system, the at least one user device, the at least one cloud service, or a combination thereof. By way of example, the maintenance platform 103 can determine whether any of the data is corrupted, whether the package size is correct, whether the authentication keys and certificates are correct, etc. In one embodiment, the maintenance platform 103 causes, at least in part, a validation of the one or more data packages before the maintenance platform 13 causes, at least in part, an initiation of the one or more maintenance operations (e.g., updating one or more maps).

Figure 7A:
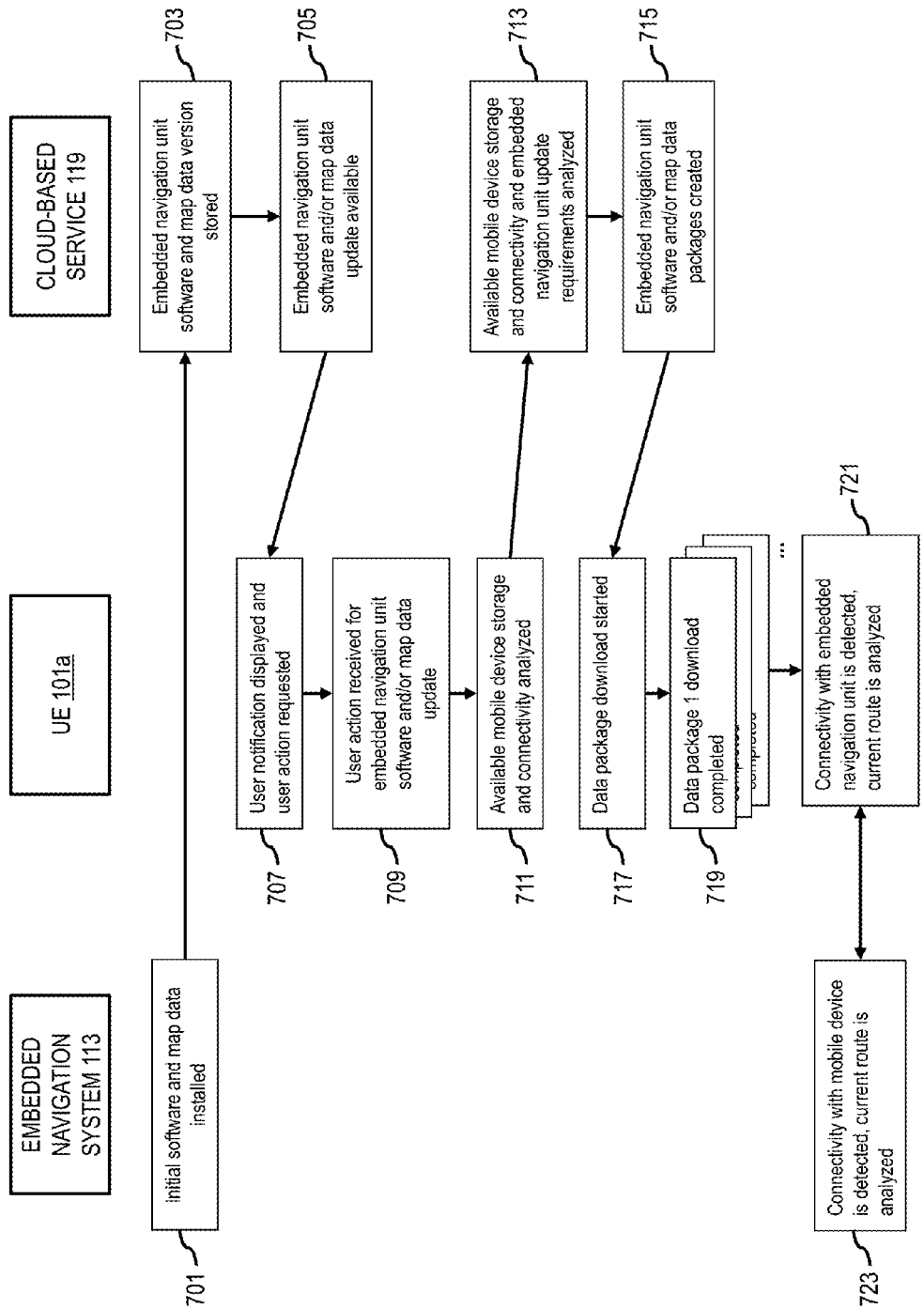
Figure 8A:
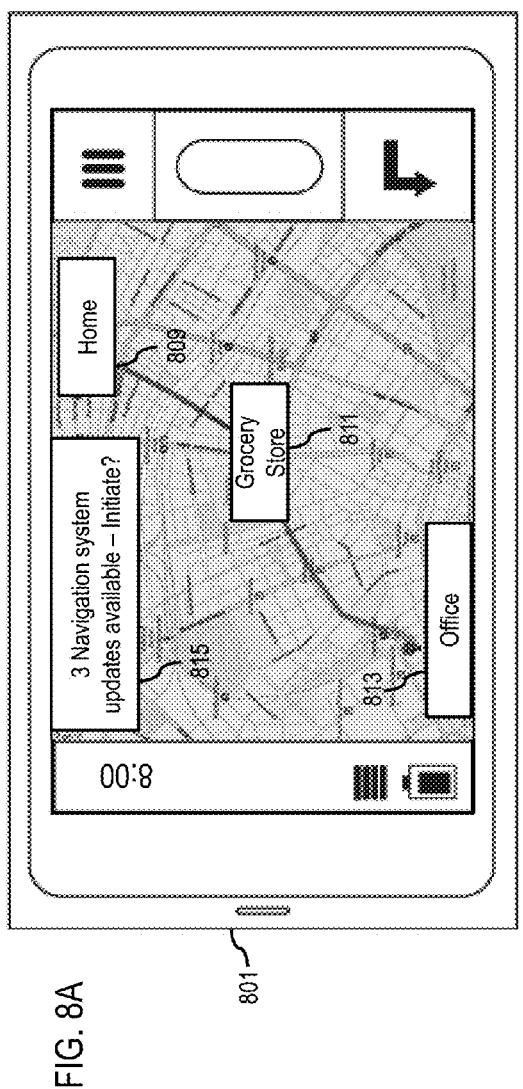
FIGS. 8A through 8D are diagrams of user interfaces utilized in the processes of FIGS. 3 through 6, according to various embodiments.
Figure 8B:
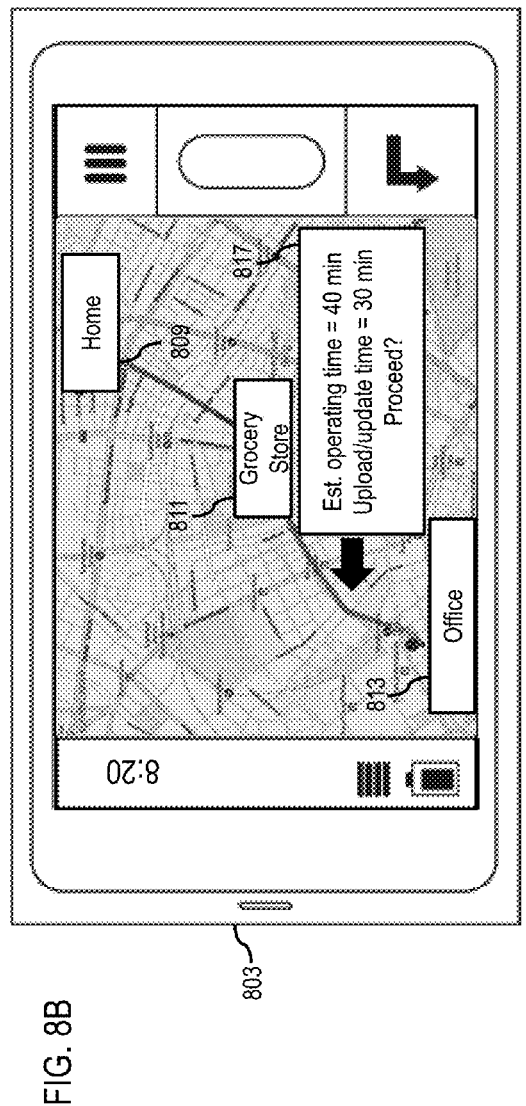
Figure 8C:
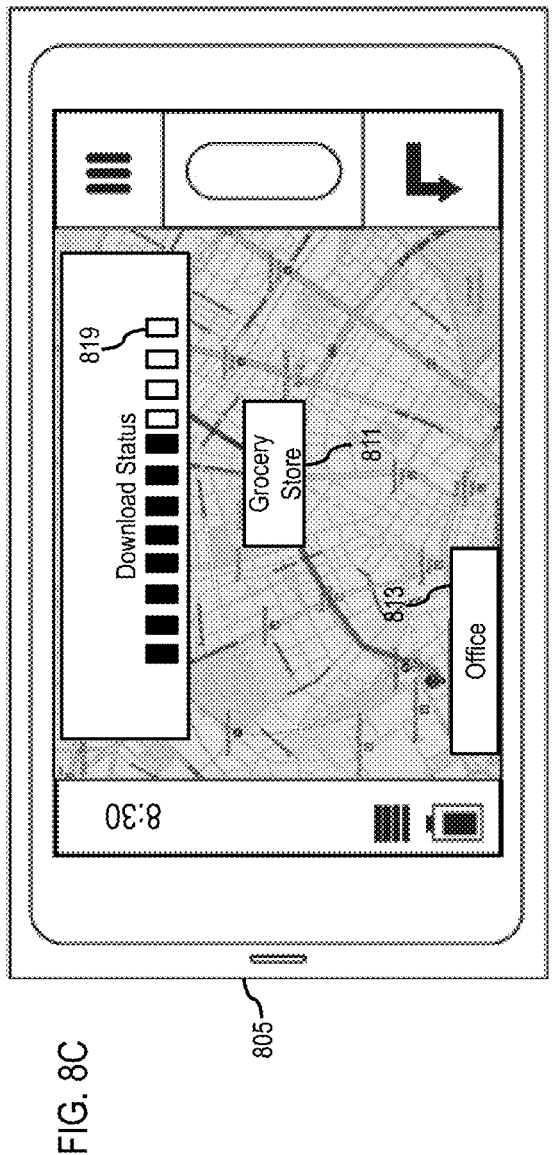
Figure 8D:
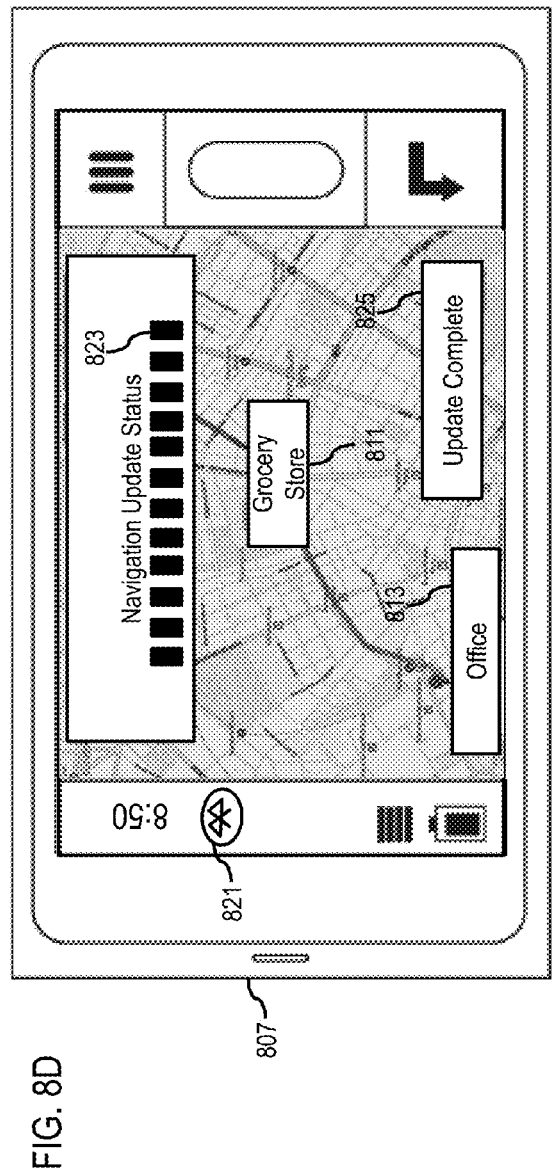

FIGS. 7A and 7B are flow charts illustrating processes for updating an embedded vehicle system during travel with one or more data packages configured based on the operating time associated with the travel, according to one embodiment. FIG. 7A depicts a process flow with an interaction on the part of at least one user. For example, the processes in the diagram 700 include at least one embedded system 113 (e.g., an embedded navigation system 113) of at least one vehicle (e.g., the vehicle 111), at least one UE 101 (e.g., a mobile phone or tablet), at least one cloud-based service 119. In step 701, the maintenance platform 103 determines whether the initial software and data (e.g., a mapping/navigation application and map data) have already been installed on the embedded navigation system 113. In step 703, the maintenance platform 103 determines whether the embedded navigation unit software and map data are also stored at a cloud-based service 119. In this example, it is contemplated that the current version of the embedded vehicle system 113 software and data has been installed in the embedded navigation system 113 and also been stored with the cloud-based service 119. In step 705, the maintenance platform 103 determines whether an update for the embedded navigation system 113 is available from the cloud-based service 119. In this example, it is contemplated that one or more updates are available.

In step 707, the maintenance platform 103 causes, at least in part, a notification to be displayed on the UE 101 (e.g., a mobile phone or tablet) with respect to a request for user interaction. In step 709, the UE 101 determines a user interaction has been received for proceeding with the update of the embedded navigation system 113 software and/or data. In step 711, upon determination of the user's interaction with the UE 101, the maintenance platform 103 determines device capability information (e.g., available storage and connectivity), resource availability information (e.g., embedded navigation system update requirements), or a combination thereof associated with the embedded navigation system 113, the UE 101, and the cloud-based service 119. In an alternative embodiment, the maintenance platform 103 may determine the device capability information and/or the resource availability information without the request for the user interaction in step 707 and/or the receipt of user interaction in step 709.

In step 711, the maintenance platform 103 causes, at least in part, an analysis of the maximum storage space of the UE 101 to define the maximum size of the one or more data packages. In step 713, the maintenance platform 103 causes, at least in part, the cloud-based service 119 to also analyze the available storage and connectivity of the UE 101. In one embodiment, it is contemplated that these analyses may take place at substantially the same time. In one example use case, if the maintenance platform 103 has already determined the current user's navigation route, the maintenance platform 103 can determine the operating and update times and the maintenance platform 103 can cause, at least in part, a configuration (e.g., by the cloud-based service 119) of the one or more data packages accordingly. Alternatively, in step 715, the maintenance platform 103 can cause, at least in part, the one or more data packages to be configured (e.g., by the cloud-based service 119) based, at least in part, on available space (e.g., the storage space of the UE 101 and/or the embedded navigation system 113). In step 717, the maintenance platform 103 causes, at least in part, the UE 101 to start downloading the one or more data packages from the cloud-based service 119 and in step 719, the maintenance platform 103 determines whether and when each of the one or more data packages has been downloaded.

In step 721, the maintenance platform 103 causes, at least in part, the UE 101 to detect connectivity with the embedded navigation system 113. In step 723, the maintenance platform 103 causes, at least in part, the embedded navigation system 113 to detect connectivity with the UE 101. In one embodiment, it is contemplated that the maintenance platform 103 may cause, at least in part, the UE 101 and the embedded navigation system 113 to detect connectivity to one another at substantially the same time. In one embodiment, once the maintenance platform 103 determines connectivity between the embedded navigation system 113 and the UE 101, the maintenance platform 103 can cause, at least in part, the embedded navigation system 113 and/or the UE 101 to analyze or determine the predicted and/or current route of the embedded navigation system 113.

FIG. 7B depicts a continuation of the process flow described with respect to FIG. 7A, as depicted by the duplication of steps 721 and 723 of FIG. 7A. In steps 725 and 727, the maintenance platform 103 causes, at least in part, the embedded navigation system 113 and the UE 101 (e.g., a mobile phone), respectively, to determine and to compare the operating time and the update time (e.g., 60 minutes of operating time compared to 45 minutes of upload/update time). In one embodiment, in step 729, the UE 101 having downloaded one or more data packages from the cloud-based service 119 in steps 717 and 719 can now start uploading the one or more data packages to the embedded navigation system 113. However, if the maintenance platform 103 determines that the operating time (e.g., the time needed for navigation) is less than the determined upload/update time, the maintenance platform 103 can cause, at least in part, the UE 101 in step 731 to request one or more smaller data packages from the cloud-based service 119. In an alternative embodiment, the embedded navigation system 113 may also request one or more smaller data packages. For example, it is contemplated that these one or more smaller data packages can be created in step 733 by the cloud-based service 119 and then once again downloaded to the UE 101, for example, in step 717.

In step 735, the maintenance platform 103 determines whether and when each of the one or more data packages has been uploaded to the embedded navigation system 113. In step 737, the maintenance platform 103 causes, at least in part, the embedded navigation system 113 to validate the receipt of the one or more data packages. Similarly, in step 739, the maintenance platform 103 causes, at least in part, the UE 101 to validate the upload of the one or more data packages to the embedded navigation system 113. Further, in step 741, the maintenance platform 103 causes, at least in part, the cloud-based service 119 to validate that the embedded navigation system 113 has received the one or more data packages and that the UE 101 has uploaded the one or more data packages to the embedded navigation system 113. In one embodiment, it is contemplated that the maintenance platform 103 may cause, at least in part, the various validation steps 737, 739, and 741 to occur at substantially the same time. In step 743, the maintenance platform 103 causes, at least in part, an initiation of an update of the embedded navigation system 113. In one example use case, as with the data package download, the maintenance platform 103 can cause, at least in part, a determination of the operating time and update time. For example, the maintenance platform 103 can determine that only one or more data packages that can be updated within the available operating time will be used at this time. In step 745, the maintenance platform 103 causes, at least in part, the embedded navigation system 113 to validate the embedded navigation system 113 update. Likewise, in step 745, the maintenance platform 103 causes, at least in part, the UE 101 to validate the embedded navigation system 113 update. Further, in step 749, the maintenance platform 103 causes, at least in part, the cloud-based service 119 to validate the embedded navigation system 113 update. In one embodiment, the maintenance platform 103 may cause, at least in part, the various validation steps 737, 739, and 741 to occur at substantially the same time.

FIGS. 8A through 8D are diagrams of user interfaces utilized in the processes of FIGS. 3-6, according to various embodiments. As shown, the example user interfaces of FIGS. 8A through 8D include one or more user interface elements and/or functionalities created and/or modified based, at least in part, on information, data, and/or signals resulting from the processes (e.g., processes 300, 400, 500, and 600) described with respect to FIGS. 3-6. For example, FIGS. 8A through 8D illustrate four user interfaces (e.g., interfaces 801, 803, 805, and 807) associated with a user of a vehicle (e.g., a vehicle 111) (not shown for illustrative convenience) and depicting a mapping and/or navigation application (e.g., an application 107).

In one embodiment, the system 100 determines the device capability information (e.g., available storage space), resource information, or a combination thereof associated with at least one embedded system 113 (e.g., an embedded navigation system 113)(not shown for illustrative convenience), at least one user device (e.g., the interfaces 801, 803, 805, and 807), at least one cloud service (e.g., a cloud-based service 119)(not shown for illustrative convenience), or a combination thereof. By way of example, the system 100 can determine that the interfaces 801, 803, 805, and 807 have 2 GB of available storage space.

In one or more embodiments, the system 100 determines an estimated operating time of at least one embedded system 113 (e.g., the embedded navigation system 113). In this example use case, the system 100 can determine the estimated operating time of the at least one embedded system 113 between a user's home 809, a grocery store 811, and the user's office 813. By way of example, the system 100 can determine an estimated operating time based, at least in part, on the user entering his or her route and/or destinations (e.g., home 809, grocery store 811 and office 813) in the UE 101. In this example, the system 100 is able to determine that a travel route includes a plurality of routes to be completed and, therefore, the system 100 is able to determine the estimated operating time based, at least in part, on the plurality of operating sessions (e.g., between the user's home 809 and the grocery store 811 and between the grocery store 811 and the user's office 813).

In one embodiment, the system 100 determines an available upload time, an available installation time, or a combination thereof based, at least in part, on the estimated operating time. In this example, the system 100 can determine that the estimated operating time between the user's home 809 and the grocery store 811 is 20 minutes and the estimated operating time between the grocery store 811 and the user's office 813 is 40 minutes. Consequently, the system 100 can determine that the required upload/update time is as follows: 20 minutes–25%=15 minutes and 40 minutes–25%=30 minutes. Further, the system 100 may determine that uploading the one or more data packages (with validation) will take the system 100 five minutes and updating the embedded navigation system 113 with the uploaded data packages will take the system 100 another five minutes for a total of ten minutes per data package. In this example, the system 100 determines that there are three data packages available for updating the embedded navigation system 113, as depicted by the notification 815 of interface 801 ("3 Navigation system updates available—Initiate"?) Based on the 10 minute upload/update time requirement, the system 100 can potentially cause, at least in part, an upload/update of three data packages one at a time, one package at one time and two packages at another time, or all three packages at one time depending upon the time and location of the user along the predicted travel route.

In one embodiment, the system 100 configures the one or more data packages for performing one or more maintenance operations (e.g., updating one or more maps) based, at least in part, on the estimated operating time. In this example use case, if the system 100 does not determine one or more dependencies among the one or more data packages for performing the one or more maintenance operations, the system 100 could cause, at least in part, a configuring of three data packages such that one data package could be uploaded and the embedded navigation system 113 updated while the user drives between his or her home 809 and the grocery store 811 and then the two remaining data packages could be uploaded and the embedded navigation system 113 updated while the user drives between the grocery store 811 and the user's office 813 or all three data packages could be uploaded and the embedded navigation system 113 updated while the user drives between the grocery store 811 and the user's office 813. However, in this example use case, the system 100 determines one or more dependencies among the one or more data packages for performing the one or more maintenance operations. For example, the system 100 determines that the three updates must be performed during the same operating time. Consequently, when the user starts his or her vehicle after leaving the grocery store 811, the system 100 can cause, at least in part, a presentation of a notification 817 in the interface 803 (e.g., "Est. operating time=40 min; Upload/Update time=30 min; Proceed"?).

In one embodiment, upon determination of the user's interaction with the interface 803, for example, the system 100 causes, at least in part, the three newly available data packages to be downloaded from a cloud-based service 119 to an interface 805 as depicted by the download status bars 819 of interface 805. In particular, after driving 10 minutes from the grocery store 811, two of the three data packages have been downloaded. In one embodiment, the system 100 determines the connectivity between the interface 807, for example, and the embedded navigation system 113. In this example use case, the interface 807 and the embedded navigation system 113 are "connected" as depicted by the Bluetooth® symbol 821 of interface 807. In one embodiment, the system 100 causes, at least in part, a transmission of the one or more data packages to the embedded navigation system 113 to initiate the one or more maintenance operations during the estimated operating time as depicted by the navigation update status bars 823. In particular, after driving 30 minutes from the grocery store 811, the three data packages have been uploaded and the update of the embedded navigation system 113 has been completed. In one embodiment, the system 100 causes, at least in part, a validation of (a) the one or more data packages, (b) a progress of one or more steps of the one or more maintenance operations, (c) a successful completion of the one or more maintenance operations, or (d) a combination thereof with respect to the embedded navigation system 113, the interface 807, the cloud-based service 119, or a combination thereof. In one embodiment, once the system 100 validates the upload and update of the embedded navigation system 113, the system 100 can cause, at least in part, a presentation of a status notification 825 in interface 807 (e.g., "Update Complete" or "Update Failed"). It is contemplated that the download status bars 819 and navigation update status bars 823 can remind the user of the vehicle 111 not to stop or turn off the vehicle 111 should the user deviate from the planned route (e.g., between the grocery store 811 and the user's office 813) and it is further contemplated that the system 100 can cause, at least in part, a presentation of a warning notification in the interface 807, for example, if the user should deviate from the planned route and appear to be reaching his or her destination ahead of time. Similarly, it is contemplated that the "Update Complete" status notification 825 can inform the user of the vehicle 111 that he or she may now stop the vehicle 111 and/or turn off the engine of the vehicle 111.

The processes described herein for updating an embedded vehicle system during travel with one or more data packages configured based on the operating time associated with the travel may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
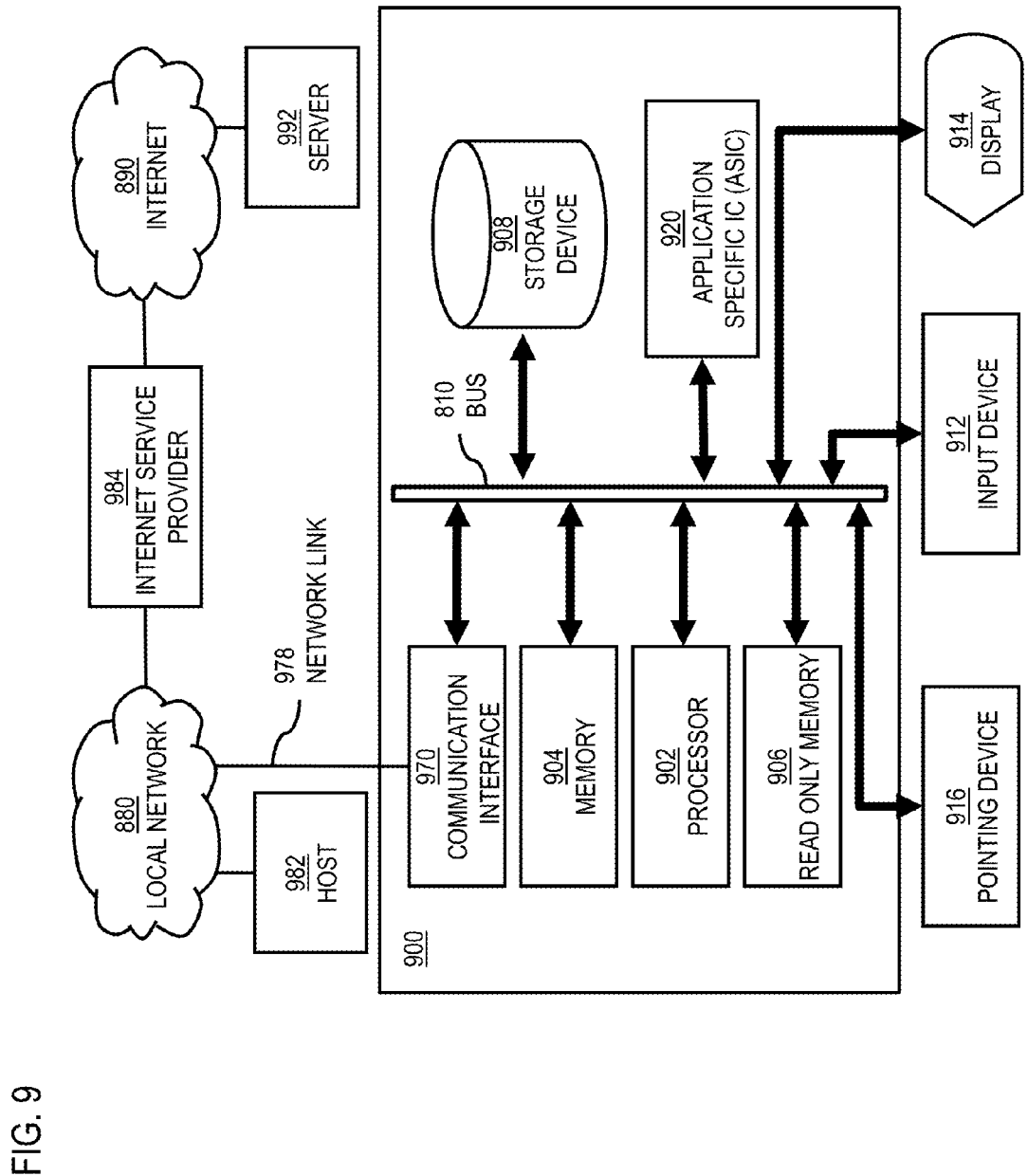
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to update an embedded vehicle system during travel with one or more data packages configured based on the operating time associated with the travel as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of updating an embedded vehicle system during travel with one or more data packages configured based on the operating time associated with the travel.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to update an embedded vehicle system during travel with one or more data packages configured based on the operating time associated with the travel. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for updating an embedded vehicle system during travel with one or more data packages configured based on the operating time associated with the travel. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for updating an embedded vehicle system during travel with one or more data packages configured based on the operating time associated with the travel, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for updating an embedded vehicle system during travel with one or more data packages configured based on the operating time associated with the travel to the UEs 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to update an embedded vehicle system during travel with one or more data packages configured based on the operating time associated with the travel as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of updating an embedded vehicle system during travel with one or more data packages configured based on the operating time associated with the travel.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to update an embedded vehicle system during travel with one or more data packages configured based on the operating time associated with the travel. The memory 1005 also stores the data associated with or generated by the execution of the inventive steps.

Figure 11:
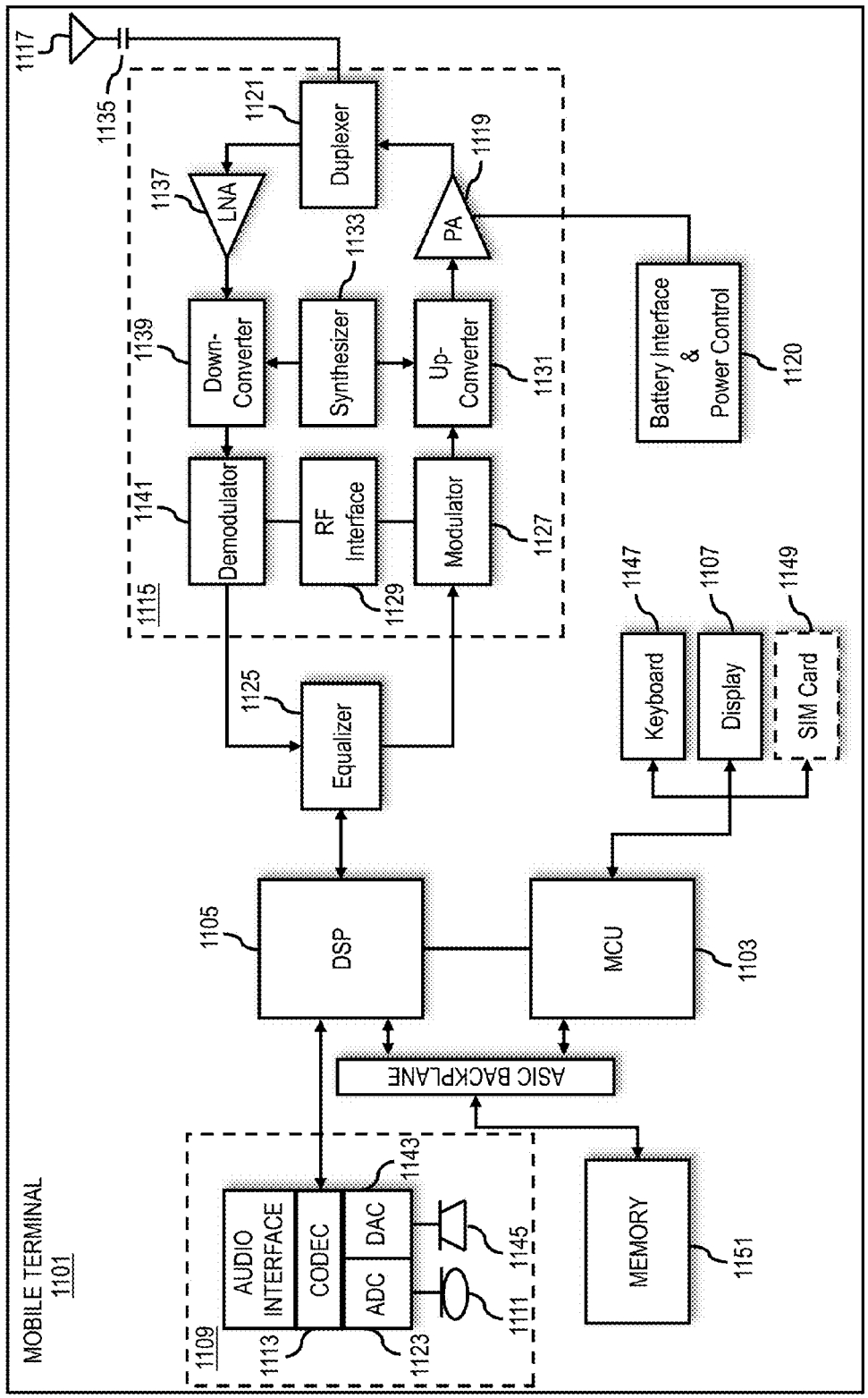
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of updating an embedded vehicle system during travel with one or more data packages configured based on the operating time associated with the travel. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or application processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of updating an embedded vehicle system during travel with one or more data packages configured based on the operating time associated with the travel. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to update an embedded vehicle system during travel with one or more data packages configured based on the operating time associated with the travel. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining, by an apparatus, that a uploading time of a maintenance operation of an embedded system in a vehicle is longer than an estimated operating time of the embedded system, wherein the estimated operating time is determined based, at least in part, on user route information that is entered via the embedded system or predicted for the embedded system;
    determining, by the apparatus, one or more subsequent estimated operating times of the embedded system available after the estimated operating time;
    configuring, by the apparatus, data packages for performing the maintenance operation with sizes to be uploaded during the estimated operating time and then during the one or more subsequent estimated operating times of the embedded system;
    calculating, by the apparatus, a maximum package size and a number of the data packages based on the estimated operating time, the one or more subsequent estimated operating times, and one or more memory areas available for the embedded system; and
    initiating, by the apparatus, a transmission of the data packages to the embedded system to initiate the maintenance operation during the estimated operating time and then during one or more subsequent estimated operating times, wherein the maintenance operation of the embedded system is completed within the estimated operating time and the one or more subsequent estimated operating times.

2. A method of claim 1, further comprising:
    initiating, by the apparatus, a display of an upload status of the data packages to the embedded system during the estimated operating time and then during the one or more subsequent estimated operating times,
    wherein the embedded system includes at least one embedded navigation system, wherein the maintenance operation further includes at least one application update operation, at least one data update operation, or a combination thereof, and wherein the sizes of the data packages are configured to ne uploaded to the embedded system and to update the embedded system within the estimated operating time and then within the one or more subsequent estimated operating times of the embedded system respectively.

3. A method of claim 2, further comprising:
    initiating a display of a update status of the embedded system during the estimated operating time and then during the one or more subsequent estimated operating times,
    wherein the estimated operating time of the embedded system includes at least a portion of an engine-running time of the vehicle.

4. A method of claim 3, wherein the user route information includes a plurality of routes to be completed over a plurality of operating sessions of the embedded navigation system, the method further comprising:
    determining the estimated operating time based, at least in part, on the plurality of operating sessions,
    wherein the estimated operating time of the embedded system includes at least a portion of a moving time of the vehicle.

5. A method of claim 1, further comprising:
determining an available upload time, an available installation time, or a combination thereof based, at least in part, on the estimated operating time,
wherein the configuring on the data packages is further based, at least in part, on the available upload time, the available installation time, or a combination thereof.

6. A method of claim 1, wherein the transmission of the data packages to the embedded system is from at least one user device, at least one cloud service, or a combination thereof, and the apparatus is embedded in the at least one user device or the at least one cloud service.

7. A method of claim 6, further comprising:
determining device capability information, resource availability information, or a combination thereof associated with the embedded system, the at least one user device, the at least one cloud service, or a combination thereof,
wherein the transmission of the data packages, the configuring of the data packages, or a combination thereof is further based, at least in part, on the device capability information, the resource availability information, the estimated operating time, or a combination thereof.

8. A method of claim 6, further comprising:
initiating a validation of (a) the data packages, (b) a progress of one or more steps of the maintenance operation, (c) a successful completion of the maintenance operation, or (d) a combination thereof with respect to the embedded system, the at least one user device, the at least one cloud service, or a combination thereof,
wherein the validation includes determining that data in the data packages is not corrupted, determining that the sizes of the data packages are correct, determining that authentication certificates of the data packages are correct, or a combination thereof.

9. A method of claim 1, further comprising:
determining one or more dependencies among the data packages for performing the maintenance operation,
wherein the configuring of the data packages is further based, at least in part, on the one or more dependencies.

10. A method of claim 1, further comprising:
initiating a deletion of one or more incomplete data packages, one or more non-validated data packages, or a combination thereof, from the one or more memory areas available for the embedded system at an end of each of the estimated operating time and the one or more subsequent estimated operating times.

11. An apparatus comprising:
at least one processor; and
at least one memory including computer program code for one or more programs,
the at least one memory and the computer program code configured to, with the at least one processor, cause the apparatus to perform at least the following,
determine that a uploading time of a maintenance operation of an embedded system in a vehicle is longer than an estimated operating time of the embedded system, wherein the estimated operating time is determined based, at least in part, on a user route information that is entered via the embedded system or predicted for the embedded system;
determine one or more subsequent estimated operating times of the embedded system available after the estimated operating time;
configure data packages for performing the maintenance operation with sizes to be uploaded during the estimated operating time and then during the one or more subsequent estimated operating times of the embedded system;
calculate a maximum package size and a number of the data packages based on the estimated operating time, the one or more subsequent estimated operating times, and one or more memory areas available for the embedded system; and
initiate a transmission of the data packages to the embedded system to initiate the maintenance operation during the estimated operating time and then during one or more subsequent estimated operating times, wherein the maintenance operation of the embedded system is completed within the estimated operating time and the one or more subsequent estimated operating times.

12. An apparatus of claim 11, wherein the embedded system includes at least one embedded navigation system, wherein the maintenance operation further includes at least one application update operation, at least one data update operation, or a combination thereof.

13. An apparatus of claim 12, wherein the user route information includes a plurality of routes to be completed over a plurality of operating sessions of the embedded navigation system, and wherein the apparatus is further caused to:
determine the estimated operating time based, at least in part, on the plurality of operating sessions,
wherein the maintenance operation is performed over the plurality of operating sessions.

14. An apparatus of claim 11, wherein the apparatus is further caused to:
determine an available upload time, an available installation time, or a combination thereof based, at least in part, on the estimated operating time,
wherein the configuring on the data packages is further based, at least in part, on the available upload time, the available installation time, or a combination thereof.

15. An apparatus of claim 11, wherein the transmission of the data packages to the at least one embedded system is from at least one user device, at least one cloud service, or a combination thereof.

16. An apparatus of claim 15, wherein the apparatus is further caused to:
determine device capability information, resource availability information, or a combination thereof associated with the at least one embedded system, the at least one user device, the at least one cloud service, or a combination,
wherein the transmission of the data packages, the configuring of the data packages, or a combination thereof is further based, at least in part, on the device capability information, the resource availability information, the estimated operating time, or a combination thereof.

17. A non-transitory computer-readable storage medium carrying one or more sequences of one or more instructions which, when executed by one or more processors, cause an apparatus to perform:
determining that a uploading time of a maintenance operation of an embedded system in a vehicle is longer than an estimated operating time of the embedded system, wherein the estimated operating time is determined based, at least in part, on a user route information that is entered via the embedded system or predicted for the embedded system;

determining one or more subsequent estimated operating times of the embedded system available after the estimated operating time;

configuring data packages for performing the maintenance operation with sizes to be uploaded during the estimated operating time and then during the one or more subsequent estimated operating times of the embedded system;

calculating a maximum package size and a number of the data packages based on the estimated operating time, the one or more subsequent estimated operating times, and one or more memory areas available for the embedded system; and initiating a transmission of the data packages to the embedded system to initiate the maintenance operation during the estimated operating time and then during one or more subsequent estimated operating times, wherein the maintenance operation of the embedded system is completed within the estimated operating time and the one or more subsequent estimated operating times.

18. A non-transitory computer-readable storage medium of claim 17, wherein the embedded system includes at least one embedded navigation system, wherein the maintenance operation further includes at least one application update operation, at least one data update operation, or a combination thereof.

19. A non-transitory computer-readable storage medium of claim 17, wherein the apparatus is further caused to perform:

determining an available upload time, an available installation time, or a combination thereof based, at least in part, on the estimated operating time, wherein the configuring on the data packages is further based, at least in part, on the available upload time, the available installation time, or a combination thereof.

* * * * *